Patented Feb. 20, 1940

2,191,206

UNITED STATES PATENT OFFICE 2,191,206

PROCESS OF PURIFYING GELATIN AND CASEIN

Charles Schwartz, Pittsburgh, Pa., assignor to Hall Laboratories, Inc., Pittsburgh, Pa., a corporation of Pennsylvania No Drawing. Application September 24, 1937, Serial No. 165,479

17 Claims. (Cl. 260—118)

This invention relates to the purification of gelatin and casein, and the present application is a continuation-in-part of my application Serial No. 752,996, filed November 14, 1934.

The demand for gelatin and casein in many fields has resulted in numerous methods for their extraction and preparation. In nearly all the methods there is involved the addition of agents for precipitation, filtration, clarification, extraction, etc. These additions result very often in the contamination of the final product with the reagents which have been used. Furthermore, gelatin and casein are often combined or associated with impurities which it is difficult to remove by the processes of purification which are now known.

In accordance with the present invention, materials containing gelatin or casein are purified by treating them with a solution which removes the impurities. As a purifying solution, I may employ a solution of an alkali-metal metaphosphate or ammonium metaphosphate, or metaphosphoric acid which may be considered as hydrogen metaphosphate, or mixtures or chemical combinations thereof. The preferred material is sodium metaphosphate, although the metaphosphates of the other alkali-metals such as potassium or lithium may be employed. All of these metaphosphates are preferably used in the soluble form commonly known as hexametaphosphate. The material which I prefer to use in the purification of gelatin and casein is the soluble sodium hexametaphosphate sometimes called "Graham's salt." This may have mixed with it a small amount of sodium pyrophosphate to counteract the slight acidity of the sodium metaphosphate. There may also be mixed with the sodium metaphosphate or the mixture of sodium metaphosphate and pyrophosphate, small quantities of alkalies such for example as sodium carbonate, sodium bicarbonate, borax, trisodium phosphate, or sodium metasilicate, these alkalies likewise being added for the purpose of counteracting the slight acidity of the sodium metaphosphate and constituting only a small proportion of the mixture.

I may also employ as the purifying material an alkali-metal tripolyphosphate such for example as sodium tripolyphosphate ($Na_5P_3O_{10}$) either alone or in admixture with an alkali-metal metaphosphate. If mixtures are employed, they may have added to them small amounts of alkaline materials, as previously described. Sodium tripolyphosphate is the most important of the alkali-metal tripolyphosphates. Crystalline sodium tripolyphosphate is a definite chemical compound of the formula $Na_5P_3O_{10}$ in its anhydrous form. It may also be prepared as a crystalline hydrate. It is not deliquescent and particularly in the hydrated form may be preserved indefinitely in ordinary atmospheres without caking or picking up moisture. It may be made by taking such quantities of sodium carbonate and phosphoric acid as will yield a molar ratio between $Na_2O$ and $P_2O_5$ of 5:3, and heating this mixture to a temperature above 540° C. until the water formed by the reaction of the sodium carbonate and phosphoric acid is driven off. The reaction mixture is preferably allowed to cool slowly in order to obtain a fully crystalline product.

The materials which may be employed in accordance with the present invention for purifying gelatin and casein may be expressed by the formula $M_2O.P_2O_5$, in which M is hydrogen, ammonium and/or an alkali-metal, and in which the molar ratio of $M_2O$ to $P_2O_5$ is less than 2:1. Thus, in sodium metaphosphate ($NaPO_3$) the molar ratio of $Na_2O$ to $P_2O_5$ is 1:1, while in sodium tripolyphosphate ($Na_5P_3O_{10}$) it is 5:3.

For purposes of conciseness, I will refer to sodium metaphosphate as the material used in the purifying solution, it being understood, however, that in all cases the metaphosphates or tripolyphosphates of the other alkali-metals or of ammonium or metaphosphoric acid or tripolyphosphoric acid may be employed in place of sodium metaphosphate.

Gelatin

Gelatin is a naturally occurring organic substance belonging to the general class known as proteins and is derived from collagen which is found in the skins and bones of animals. The uses of gelatin are very numerous, among the most important of which are its use in the manufacture of glue, in the photographic industry in the form of films, and as a food product.

Briefly described, gelatin is prepared according to prior known methods by treating the stock such as hides, sinews, bones, etc., with a saturated solution of calcium hydroxide which swells the protein fibers and causes a separation of mucin. The stock is then bleached, hydrogen peroxide or sulphur dioxide generally being employed as the bleaching agent. The lime is then removed by washing with water, neutralization with acid, and further washing with water. The treatments yield insoluble collagen from which the gelatin is extracted by hot water, the extraction of the gelatin by hot water being generally known as the boiling process. This produces an aqueous solution of gelatin which may be concentrated by heat or evaporation to form a solid gel which may thereafter be further heated or baked to produce solid dry gelatin.

In this method there is the great possibility of contamination of the gelatin by insufficient removal of the calcium and by contamination with other materials in the water, such as magnesium and iron. In attempting to remove all of the lime by neutralization with acid, the gelatin may be acidified beyond the point desirable for the finished product.

In accordance with the present invention, the stock containing the collagen or gelatin is treated with a purifying solution of sodium metaphosphate or other material of the type previously referred to, for the purpose of removing calcium, magnesium, iron and other impurities from the stock. Sodium metaphosphate combines with the calcium, magnesium or iron, forming a very slightly ionized soluble complex. The complex formed with the sodium metaphosphate where calcium is present is a very slightly ionized, soluble sodium-calcium metaphosphate complex. Since this complex is soluble, the impurities removed from the stock remain in the purifying solution, which is then separated from the gelatin by decantation, filtration or other suitable method. The purified stock is then subjected to the boiling process which extracts the gelatin. The gelatin solution may then be concentrated and the gelatin obtained in solid form if desired.

The metaphosphate or other purifying solution is used preferably in the final washing step which precedes the extraction of gelatin from the stock with hot water. Some of the lime remaining after the washing with water may be removed with acid, and the lime which remains after the acid treatment may be removed by washing the gelatin with the metaphosphate solution. However, the metaphosphate solution may be used to replace entirely the neutralization with acid. The metaphosphate solution dissolves the alkaline earth metals, calcium and magnesium and certain other metals such as iron, thereby producing gelatin free from metallic ions which are generally regarded as producing an inferior or unsuitable product. Furthermore, since the purifying solution removes such substances as tend to cause cloudiness in the gelatin, the value of the gelatin, particularly for photographic purposes, is enhanced.

The use of the metaphosphate or other purifying solution has the further advantage that it will function at any pH within wide limits. Hence, the pH of the purifying solution may be adjusted to any point at which the solution least affects the desired properties of the final product. As illustrative of this point, the pH of gelatin greatly affects the swelling power, viscosity, etc. In order that the gelatin have optimum properties, its pH should be between 5 and 7. The metaphosphate solution functions efficiently within this pH range and, accordingly, does not deleteriously affect the properties of the gelatin. However, in washing gelatin with acid, the pH of the solution is markedly lower than this and there is a tendency for the final product to have a lower pH than the optimum. The pH of a metaphosphate solution may be adjusted to any point between 5 and 7, thus insuring complete removal of the mineral matter without danger of affecting the pH of the final product or of hydrolyzing the gelatin. The amount of metaphosphate used depends upon the amount of impurities to be removed. Usually it is necessary to use about ten times as much by weight of metaphosphate as calcium, magnesium, iron, etc., which are to be removed.

Casein

Casein is another organic material belonging to the class of substances known as proteins. The principal source of casein is milk, the casein being in combination with calcium. Casein is always found together with calcium, and wherever the removal of calcium, magnesium, iron, etc., whether such impurities are present in the original material from which the casein is prepared or are present because of contamination due to the use of materials employed in the process of preparing the casein, is necessary or desirable, it may be effected with a solution of sodium metaphosphate or other material of the type which has been previously described.

Although I have referred specifically to the use of sodium metaphosphate as a purifying material, it is to be understood that the invention is not limited thereto, but that the other purifying materials referred to may be employed in place of the sodium metaphosphate, and that the invention may be otherwise embodied or practiced within the scope of the following claims.

I claim:

1. The process of purifying a material of the group consisting of gelatin and casein, which comprises treating said material with a solution of a compound of the formula $M_2O.P_2O_5$, in which M is at least one member of the group consisting of hydrogen, ammonium and an alkali-metal, and in which the molar ratio of $M_2O$ to $P_2O_5$ is less than 2:1, and separating the solution containing the impurities from the material being purified.

2. The process of purifying a material of the group consisting of gelatin and casein, which comprises treating said material with a solution of a compound of the group consisting of alkali-metal metaphosphate and alkali-metal tripolyphosphate, and separating the solution containing the impurities from the material being purified.

3. The process of purifying a material of the group consisting of gelatin and casein, which comprises treating said material with a solution of an alkali-metal metaphosphate, and separating the solution containing the impurities from the material being purified.

4. The process of purifying a material of the group consisting of gelatin and casein, which comprises treating said material with a solution of sodium metaphosphate, and separating the solution containing the impurities from the material being purified.

5. The process of purifying a material of the group consisting of gelatin and casein, which comprises treating said material with a solution of sodium hexametaphosphate, and separating the solution containing the impurities from the material being purified.

6. The process of purifying a material of the group consisting of gelatin and casein, which comprises treating said material with a solution of an alkali-metal tripolyphosphate, and separating the solution containing the impurities from the material being purified.

7. The process of purifying a material of the group consisting of gelatin and casein, which comprises treating said material with a solution of sodium tripolyphosphate, and separating the solution containing the impurities from the material being purified.

8. The process of purifying a material of the group consisting of gelatin and casein containing an alkaline earth metal compound, which comprises treating said material with a solution of a compound of the formula $M_2O.P_2O_5$, in which M is at least one member of the group consisting of hydrogen, ammonium and an alkali-metal, and in which the molar ratio of $M_2O$ to $P_2O_5$ is less than 2:1.

9. The process of purifying gelatin, which comprises treating it with a solution of an alkali-metal metaphosphate and separating the solution containing the impurities from the gelatin.

10. The process of purifying gelatin containing an alkaline earth metal compound, which comprises treating it with a solution of an alkali-metal metaphosphate and separating the solution containing the alkaline earth metal compound from the gelatin.

11. The process of purifying gelatin containing an alkaline earth metal compound, which comprises treating it with a solution of sodium metaphosphate and separating the solution containing the alkaline earth metal compound from the gelatin.

12. The process of purifying gelatin containing an alkaline earth metal compound, which comprises employing an alkali-metal metaphosphate solution as the final washing solution for the gelatin and separating the washing solution containing the alkaline earth metal compound from the gelatin.

13. The process of purifying casein, which comprises treating it with a solution of a compound of the formula $M_2O.P_2O_5$, in which M is at least one member of the group consisting of hydrogen, ammonium and an alkali-metal, and in which the molar ratio of $M_2O$ to $P_2O_5$ is less than 2:1 and separating the solution containing the impurities from the casein.

14. The process of purifying casein, which comprises treating it with a solution of sodium metaphosphate and separating the solution containing the impurities from the casein.

15. The process of removing calcium, magnesium or iron impurities from a material of the group consisting of gelatin and casein, which comprises treating said material with a solution of a compound of the formula $M_2O.P_2O_5$, in which M is at least one member of the group consisting of hydrogen, ammonium and an alkali-metal, and in which the molar ratio of $M_2O$ to $P_2O_5$ is less than 2:1, and separating the solution containing the impurities from the material being purified.

16. The process of purifying gelatin containing an alkaline earth metal compound, which comprises treating it with a solution of sodium hexametaphosphate having a pH between 5 and 7, and separating the solution from the gelatin.

17. The process of removing calcium, magnesium or iron impurities from material of the group consisting of gelatin and casein, which comprises treating said material with a solution of an alkali-metal metaphosphate which dissolves the impurities, and separating the solution containing the impurity from the gelatin or casein.

CHARLES SCHWARTZ.